(12) United States Patent
Altindaş

(10) Patent No.: US 12,423,545 B2
(45) Date of Patent: Sep. 23, 2025

(54) SECURE FINGER SENSING CONTACTLESS CARD

(71) Applicant: Erhan Altindaş, Istanbul (TR)

(72) Inventor: Erhan Altindaş, Istanbul (TR)

( * ) Notice: Subject to any disclaimer, the term of this patent is extended or adjusted under 35 U.S.C. 154(b) by 0 days.

(21) Appl. No.: 18/842,520

(22) PCT Filed: Jun. 2, 2022

(86) PCT No.: PCT/TR2022/050521
§ 371 (c)(1),
(2) Date: Aug. 29, 2024

(87) PCT Pub. No.: WO2023/211396
PCT Pub. Date: Nov. 2, 2023

(65) Prior Publication Data
US 2025/0165740 A1    May 22, 2025

(30) Foreign Application Priority Data

Apr. 25, 2022    (TR) .............................. 2022/0067583

(51) Int. Cl.
| G06K 19/07 | (2006.01) |
| G06Q 20/20 | (2012.01) |
| G06Q 20/32 | (2012.01) |
| G06Q 20/34 | (2012.01) |
| G06Q 20/40 | (2012.01) |

(52) U.S. Cl.
CPC ..... G06K 19/0718 (2013.01); G06K 19/0723 (2013.01); G06Q 20/20 (2013.01); G06Q 20/3278 (2013.01); G06Q 20/341 (2013.01); G06Q 20/357 (2013.01); G06Q 20/40145 (2013.01)

(58) Field of Classification Search
None
See application file for complete search history.

(56) References Cited

U.S. PATENT DOCUMENTS

| 2016/0217455 A1 | 7/2016 | Inc |
| 2017/0228631 A1* | 8/2017 | Larsen ............. G06K 19/07354 |

FOREIGN PATENT DOCUMENTS

CA    2970007 A1    12/2018

OTHER PUBLICATIONS

International Search Report for corresponding PCT/TR2022/050521 dated Nov. 30, 2022.
Written Opinion of the International Searching Authority for corresponding PCT/TR2022/050521 dated Nov. 30, 2022.

* cited by examiner

*Primary Examiner* — Kristy A Haupt
(74) *Attorney, Agent, or Firm* — Egbert, McDaniel & Swartz, PLLC

(57) ABSTRACT

Disclosed is a secure finger sensing contactless card developed to prevent unintentional and unannounced withdrawals from contactless credit card and contactless debit card users and to protect users from suffering unwanted situations such as theft. The secure finger sensing contactless card provides users with a safe use during shopping since the contactless credit cards and contactless debit cards do not make payment unless they detect the fingerprint of the person.

1 Claim, 5 Drawing Sheets

SECURE FINGER SENSING CONTACTLESS CARD

FIELD OF THE INVENTION

The present invention relates to a secure finger sensing contactless card developed to prevent unintentional and unannounced withdrawals from contactless credit card and contactless debit card users and to protect users from suffering unwanted situations such as theft.

It provides users with a safe use during shopping since contactless credit cards and contactless debit cards do not make payment unless they detect the fingerprint of the person.

PRIOR ART

Today, NFC (Near Field Communication) based contactless credit card and contactless debit card systems are always ready for payment. Therefore, payments can be made beyond the knowledge of the users with a POS device that is approximated to contactless credit cards and contactless debit cards.

Methods such as setting a one-time or daily spending limit are used to protect users in the state of the art.

However, this system, which is currently in use, makes payments from the card without the knowledge of the person by bringing a POS device closer to the bag or wallet that the user keeps when he/she is not using the card, and suffering of the users with unannounced money withdrawals made repeatedly within the total spending limit predefined by the bank and within the allowed instant limits cannot be prevented. Some users do not activate the contactless feature on their cards due to this security weakness and concern, and banks do not have any security measures against the aforementioned theft method.

DESCRIPTION OF THE INVENTION

Secure finger sensing contactless card is realized to fulfill the aims of the present invention is shown in the figures.

In these figures.

Figure 1:
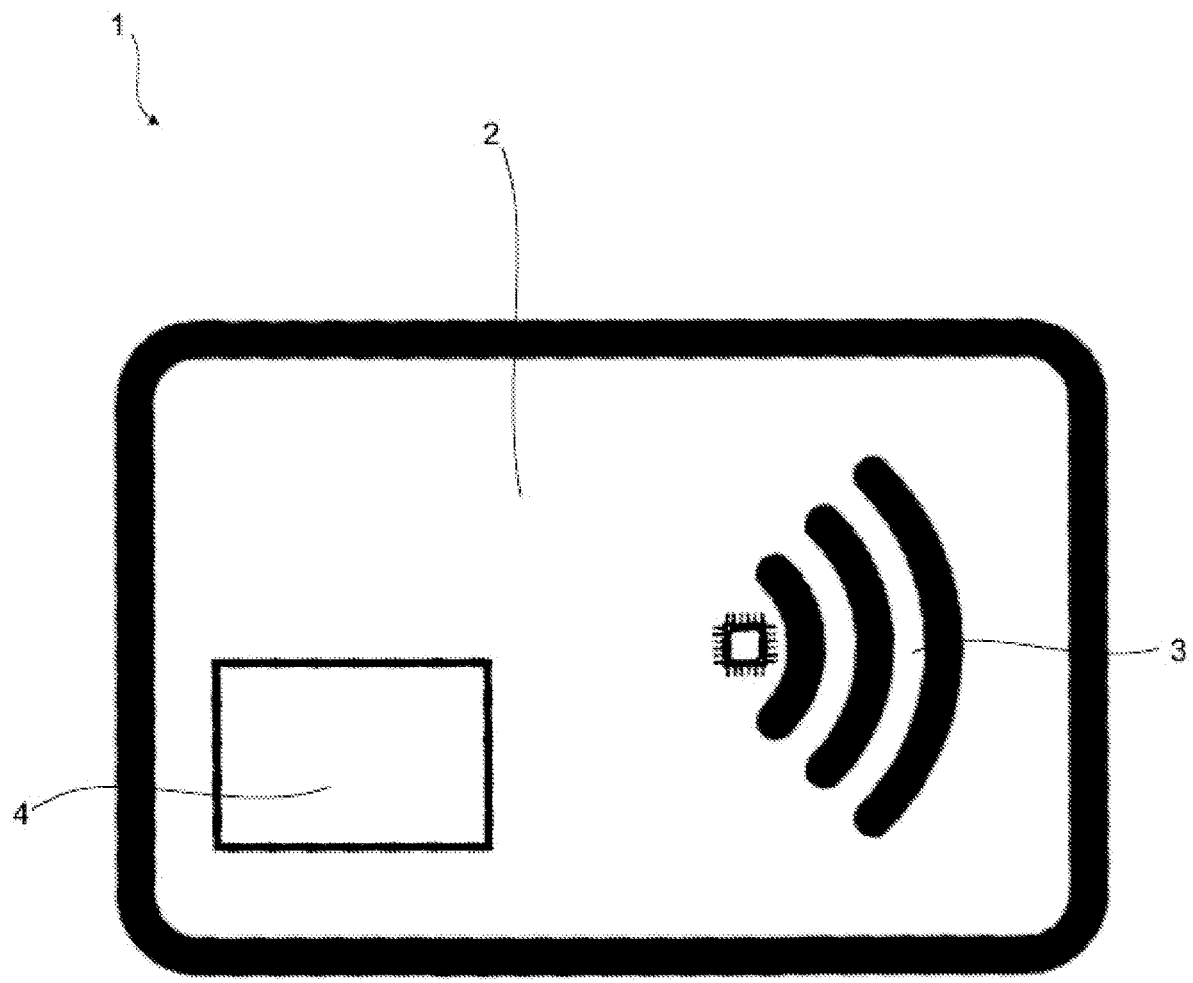
FIG. 1 is the plan view of the inventive secure finger sensing contactless card.
Figure 2:
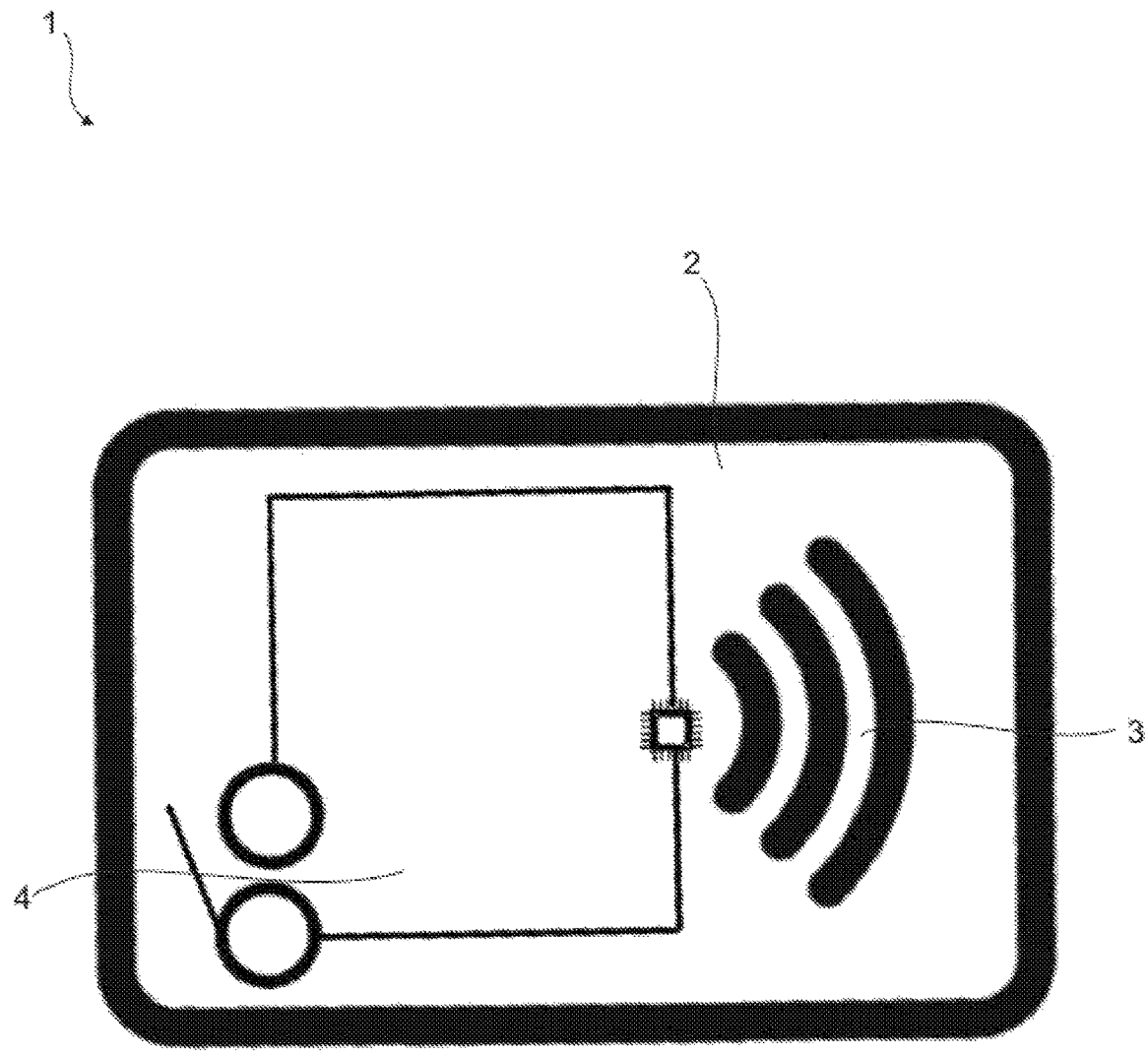
FIG. 2 is a view of the inventive secure finger sensing contactless card, when two conductive poles are used on the finger sensing surface.
Figure 3:
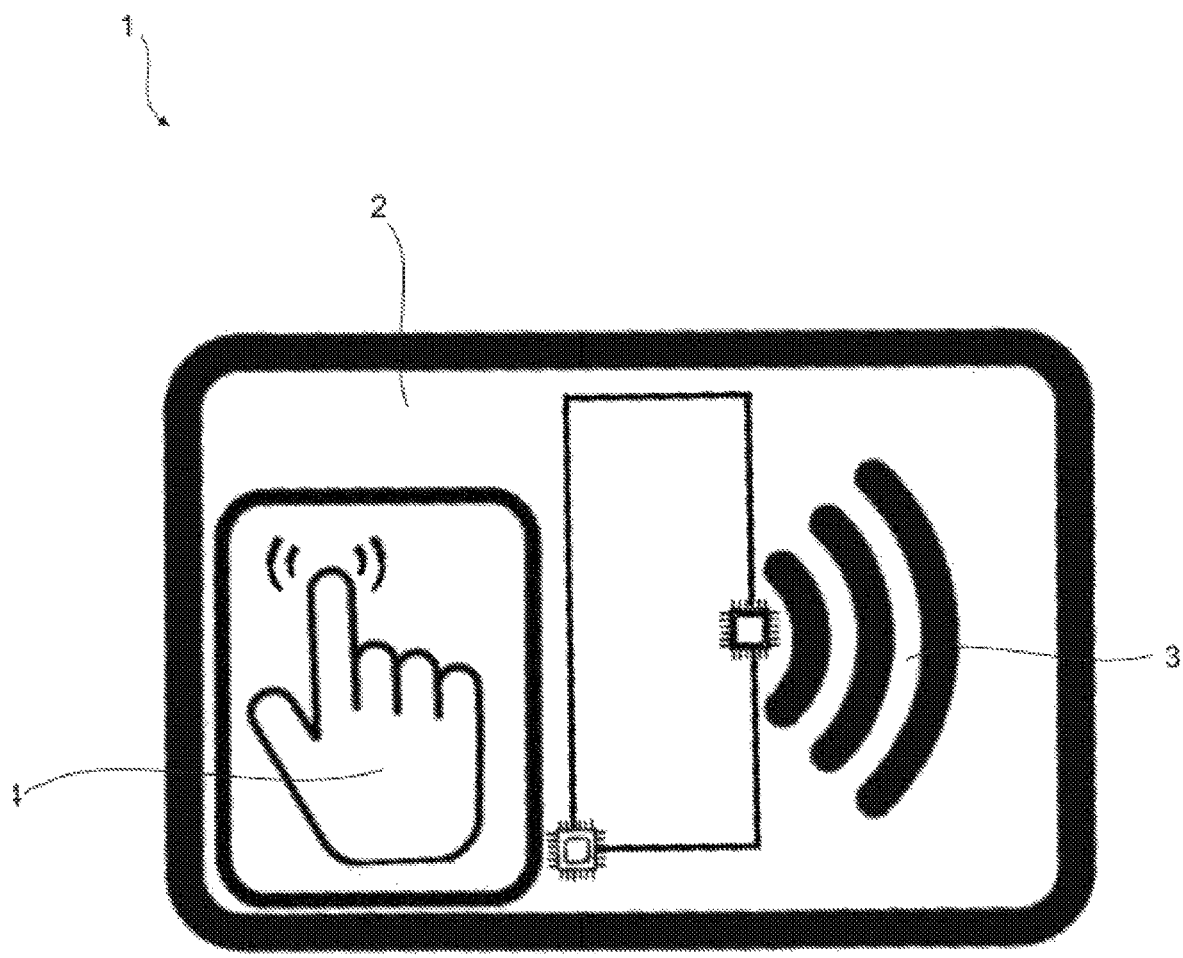
FIG. 3 is a view of the inventive secure finger sensing contactless card, when the capacitive surface is used on the finger sensor surface.
Figure 4:
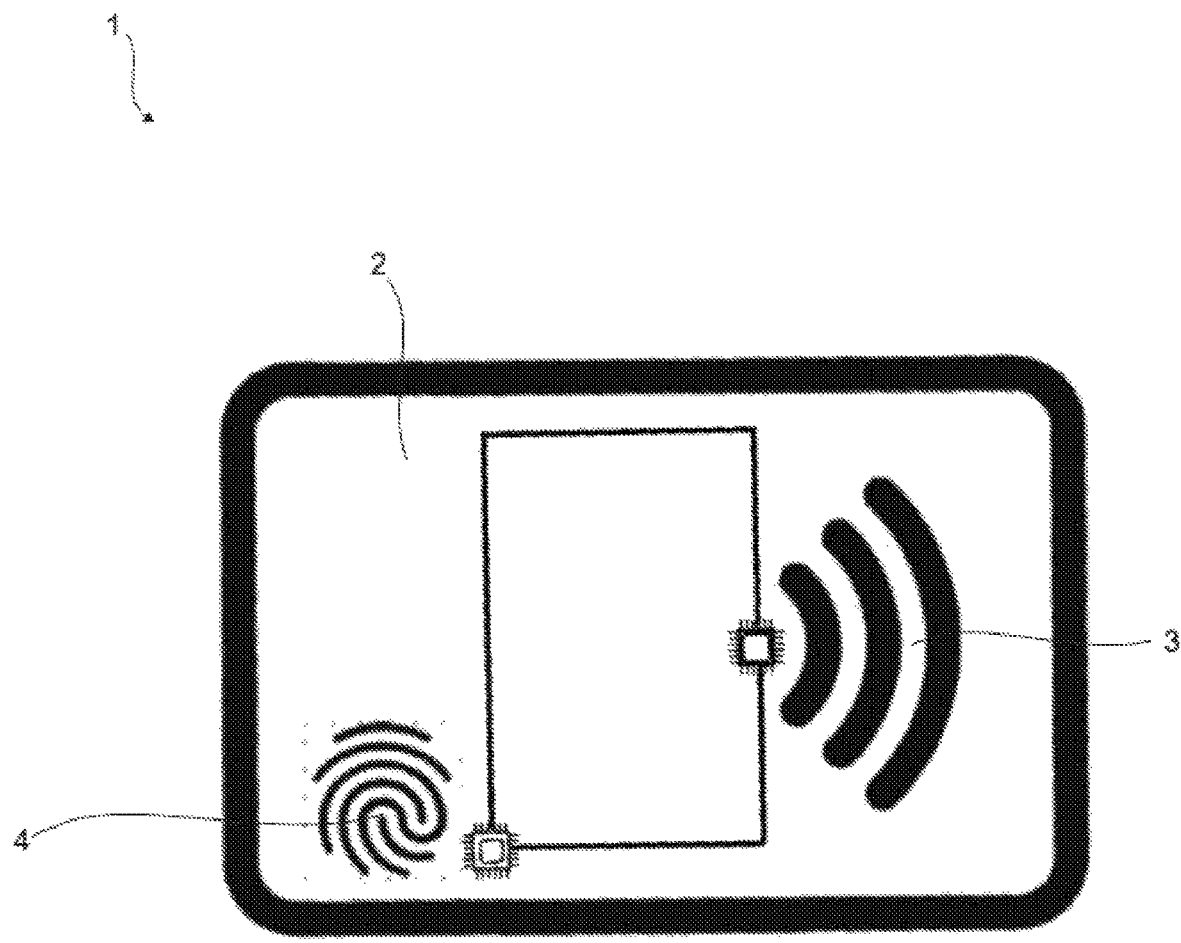
FIG. 4 is a view of the inventive secure finger sensing contactless card, when the fingerprint reader is used on the finger sensor surface.
Figure 5:
FIG. 5 is a view of the use of the inventive secure finger sensor contactless card.

The parts that constitute the inventive secure finger detecting contactless card are enumerated as follows in the attached figures:

1—Secure finger detecting contactless card
2—Card body
3—Near Field/Area Communication
4—Finger Sensing Surface The inventive secure finger sensing contactless card (1) comprises of the following;

Card body (2),
Near field/area communication (3) providing wireless connection between the card body (2) and the POS device via radio waves,
Finger sensing surface (4) that is located on the card body (2), activates the near field/area communication (3) by completing the contactless payment circuit with the help of the two conductive poles or capacitive surface it contains, with the touch of a human finger.

The inventive finger sensing surface (4) located on the secure finger sensing contactless card (1) can consist of two conductive poles or capacitive surfaces, or it can optionally be produced from a fingerprint reader. Thus, it provides security in adverse situations such as theft of the card by providing a personal use opportunity to the users.

Users can make secure payments by adhering to the existing traditional method, by simply touching their contactless credit card and contactless debit card, without needing any hardware such as a phone to perform extra verification, or any extra password information with the help of the inventive secure finger sensing contactless card (1).

As long as there is no human finger contact with the finger sensing surface (4), the contactless payment circuit is not completed and does not activate the near field/area communication (3). Thus, in cases where payment will not be made, for example, when contactless credit card and contactless debit card are kept in a purse or wallet, that is, when there is no need for a withdrawal, the secure finger sensing contactless card (1) does not allow any banking transactions. In this way, users can keep their credit and debit cards securely.

In addition to the secure shopping and storage opportunities provided by the inventive secure finger sensing contactless card (1), it does not increase the cost and provides an economical usage opportunity to the users since it does not require any hardware updates and hardware changes in the existing POS devices.

When two conductive poles are used on the finger sensing surface (4); the contactless payment circuit is completed and the transaction is completed with the touch of a human finger. Since the circuit is not completed in the standby mode, contactless payment is disabled. The circuit switch, which is completed with human contact, is connected to a circuit that will prevent the power line, data line, antenna circuit or NFC (Near Field Communication (3)) that will prevent the system from working. The circuit switch, which is completed with human contact, can be positioned side by side or close to the surface of the card, or on the front and back of the card, depending on the easy handling and ergonomics of use, or it can be positioned separately at its four corners. The basic condition is that the process is completed after the completion of the circuit with the human touch and that it does not wait actively in every case where the circuit is not completed. The only requirement is to complete the circuit with a human touch by making minimum extra effort without changing the current habits of the user according to the standard grip style, and then to have the contactless payment system active. Otherwise, the contactless payment system waits ineffectively, as the circuit is not completed while the card is in the card carrying state inside the enclosure. In this case, the secure finger sensing contactless card (1) does not react to a POS device that is brought closer to the purse or wallet in which it is stored.

When a capacitive surface is used on the finger sensing surface (4); the contactless payment circuit is completed and the transaction is completed with the touch of a human finger. Since the circuit is not completed in the standby mode, contactless payment is disabled. In this system, the capacitive surface can be positioned on the entire card or on a certain area, depending on the ergonomics of the easy grip. The only requirement is to complete the circuit with a human touch by making minimum extra effort without changing the current habits of the user according to the standard grip and usage style, and then to have the contactless payment system active. Capacitive surface to which the circuit switch completed with human contact is connected is connected to a circuit that will prevent the power line, data line, antenna or NFC (Near Field Communication (3)) circuit that will prevent the system from working. Otherwise, the contactless payment system waits inactively, as the circuit is not completed while the secure finger sensing contactless card (1) is in the card carrying state inside the enclosure. In this case, it does not react to a POS device that is brought closer to the purse or wallet in which it is stored.

When a fingerprint reader is used on the finger sensing surface (4); the contactless payment circuit is completed and the transaction is completed with the defined finger contact of the user whose fingerprint is defined in the system. Contactless payment is inactivated in standby mode and in unauthorized uses without fingerprint defined because the circuit is not completed. In this system, the fingerprint sensor can be located on the entire card or in different parts of the card, depending on the ergonomics of the easy grip. The only requirement is to identify the fingerprint of the circuit by making minimum extra effort without changing the current habits of the user according to the standard grip and usage style, and to activate the contactless payment system after this successful identification process. Fingerprint verification is connected to a circuit that prevents power line, data line, antenna or NFC (Near Field Communication (3)) circuit that will block the operation of the internal fingerprint reader to which the completed circuit switch is connected. Passive NFC (Near Field Communication (3)) based devices such as contactless credit cards and contactless debit cards work by drawing power from the fields generated by active devices. Therefore, there is no need for an extra battery on the contactless credit card and contactless debit card, but it is automatically ensured that the fingerprint reader receives the energy it needs from an active device such as a POS device in order to operate. Otherwise, the contactless payment system waits inactively, as the circuit is not completed while the card is in the card carrying state inside the enclosure. In this case, it does not react to a POS device that is brought closer to the purse or wallet in which it is stored. In addition, the system still does not work without user-defined fingerprint verification in response to the POS device in this condition.

The use of the inventive secure finger sensing contactless card (1) is as follows; after shopping, the user takes out the secure finger sensing contactless card (1) with at least one security condition, from the place where it is kept. Then, the user takes the card in his/her hand by holding the same with the positive and negative pole touch, capacitive zone contact touch or the finger defined in the internal fingerprint reader, depending on the security condition of the contactless credit card and contactless debit card and only the way they are held. Then it moves closer to the POS device. Finally, the currently used NFC (Near Field Communication (3)) circuit is active when the user holds the secure finger sensor contactless card (1) and only as long as the card is in his/her hand. Since the circuit is not completed when the card is placed in the storage area after payment, the NFC (Near Field Communication (3)) circuit is not active and the user is safe against theft.

The invention claimed is:
1. A secure finger sensing contactless card comprising:
 a card body;
 a near field communication device that is adapted to provide a wireless radio wave connection between said card body and a point-of-sale device; and
 a finger sensing surface affixed or formed on said card body, said finger sensing surface having a pair of spaced-apart conductive poles or capacitive surfaces that activates said near field communication device by completing a circuit between the pair of spaced-apart conductive poles or capacitive surfaces by a touch of a human finger therebetween, the pair of spaced-apart conductive poles or capacitive surfaces not actuating the near field communication device or completing the circuit upon an absence of touch by the human finger.

\* \* \* \* \*